United States Patent
Pauley, Jr. et al.

(10) Patent No.: US 10,462,105 B1
(45) Date of Patent: Oct. 29, 2019

(54) METHOD AND APPARATUS FOR ENCRYPTION WITH VIEWER IDENTITY—AND CONTENT ADDRESS-BASED IDENTITY PROTECTION

(75) Inventors: Wayne A. Pauley, Jr., Hudson, NH (US); Stephen J. Todd, Shrewsbury, MA (US); Michel F. Fisher, Natick, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 45 days.

(21) Appl. No.: 13/247,623

(22) Filed: Sep. 28, 2011

(51) Int. Cl.
*H04L 9/00* (2006.01)
*H04L 29/06* (2006.01)

(52) U.S. Cl.
CPC .............. *H04L 63/0245* (2013.01)

(58) Field of Classification Search
USPC .............. 726/11, 13; 713/165, 167
See application file for complete search history.

(56) References Cited

U.S. PATENT DOCUMENTS

| | | | | |
|---|---|---|---|---|
| 8,032,750 B2* | 10/2011 | Swedor et al. | | 713/170 |
| 2006/0020799 A1* | 1/2006 | Kemshall | | H04L 63/083 |
| | | | | 713/170 |
| 2006/0075228 A1* | 4/2006 | Black | | H04L 63/0428 |
| | | | | 713/167 |
| 2006/0127037 A1* | 6/2006 | Van Hoff | | G06F 3/0481 |
| | | | | 386/233 |
| 2009/0296657 A1* | 12/2009 | Omar et al. | | 370/331 |
| 2010/0049807 A1* | 2/2010 | Thompson | | 709/206 |

* cited by examiner

*Primary Examiner* — Christopher J Brown
(74) *Attorney, Agent, or Firm* — Ryan, Mason & Lewis, LLP

(57) ABSTRACT

Private information is frequently made public or semi-public, often without foresight as to the consequences of such a divulgence. Additionally, intentionally divulged information that is intended to be maintained as private is routinely sold to advertisers and information brokers. Example embodiments of the present invention relate to a method, an apparatus and a computer-program product for encrypting privacy-related information in a data stream. The method includes receiving a data stream transmitted from a source. A contextual analysis is then performed on the content of privacy-related portions of the data stream. The privacy-related portions of the data stream are then encrypted according to the contextual analysis before being forwarded to the intended destination.

17 Claims, 12 Drawing Sheets

METHOD AND APPARATUS FOR ENCRYPTION WITH VIEWER IDENTITY—AND CONTENT ADDRESS-BASED IDENTITY PROTECTION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This Application is related to U.S. patent application Ser. No. 13/247,423, entitled "METHOD AND APPARATUS FOR FRIENDLY MAN-IN-THE-MIDDLE DATA STREAM INSPECTION" Ser. No. 13/247,549, entitled "METHOD AND APPARATUS FOR PRIVACY-RESPECTING NOTIFICATION OF SECURITY THREATS", filed concurrently with the present Application on Sep. 28, 2011, the teachings of which are hereby incorporated by reference in their entirety.

TECHNICAL FIELD

This application relates to data privacy.

BACKGROUND

Privacy is the claim of individuals, groups or institutions to determine for themselves when, how, and to what extent information about them is communicated to others. Private information is frequently made public or semi-public via emails, blogs and postings to social networking services, such as Facebook, Twitter, LinkedIn and FourSquare, often without foresight as to the consequences of such a divulgence. It has been reported that information publicly posted to social networking services has been used in firing individuals from their employment and has been used by criminals to find targets for burglaries.

Additionally, intentionally divulged information that is intended to be maintained as private is routinely sold to advertisers and information brokers. Moreover, with the proliferation of app usage in mobile devices, additional information is available on the "information market," including users' location, age, gender, income, ethnicity, sexual orientation and political views. As recently reported by the Wall Street Journal, of 101 popular smartphone apps, 56 transmitted the device ID without the user's consent, 47 sent location information, and 5 sent age, gender and other personally identifiable information to outsiders.

SUMMARY

Example embodiments of the present invention relate to a method, an apparatus and a computer-program product for encrypting privacy-related information in a data stream. The method includes receiving a data stream transmitted from a source. A contextual analysis is then performed on the content of privacy-related portions of the data stream. The privacy-related portions of the data stream are then encrypted according to the contextual analysis before being forwarded to the intended destination.

BRIEF DESCRIPTION OF THE DRAWINGS

The above and further advantages of the present invention may be better understood by referring to the following description taken into conjunction with the accompanying drawings in which.

DETAILED DESCRIPTION

As the number of Internet-connected devices in the home and the enterprise continues to rise, the concept of privacy is increasingly caught in the midst of two divergent forces: that individual, group or institution's likely desire to maintain information as private, and the increasing vulnerability of such information to a privacy breach or unintended disclosure. Internet-connected devices in the household/enterprise may include personal computers, laptop computers, televisions, audiovisual receivers, music players, radios, appliances and gaming systems. While many of these devices have a method to block Internet access wholesale, they lack finer-grain controls for limiting Internet access.

For example, current methods for controlling the disclosure of private information include centralized devices that block wholesale access to a particular resource by using source/destination routing filters, regardless of content that is being sent to or received from that resource. Further, while there are some endpoint-based protections that examine content, they are one-off per client, require an administrator to set up and manage each device manually, and do not protect all device types (i.e., are only available on certain platforms). Moreover, while many of these devices provide logging capabilities, the rapidly increasing number of such devices and the amount of information they log removes from the realm of possibility an administrator's ability to police those logs to determine, albeit after the fact, private information that was disclosed.

Therefore, a centralized point of control is desirable that performs a contextual analysis of content of privacy-related portions of a data stream. Within the household, for example, a broadband router is generally a common access point for most home-based Internet-connected devices. In other words, example embodiments of the present invention provide an intelligent layer implemented, for example, in the router (or as a standalone device) that can inspect the payload of a data stream for keywords and employ a blocking or masking mechanism to protect unauthorized or potentially harmful data from escaping the household (i.e., intentional or accidental), irrespective of source-type (i.e., agentless) and in a manner transparent to the destination.

Figure 1:
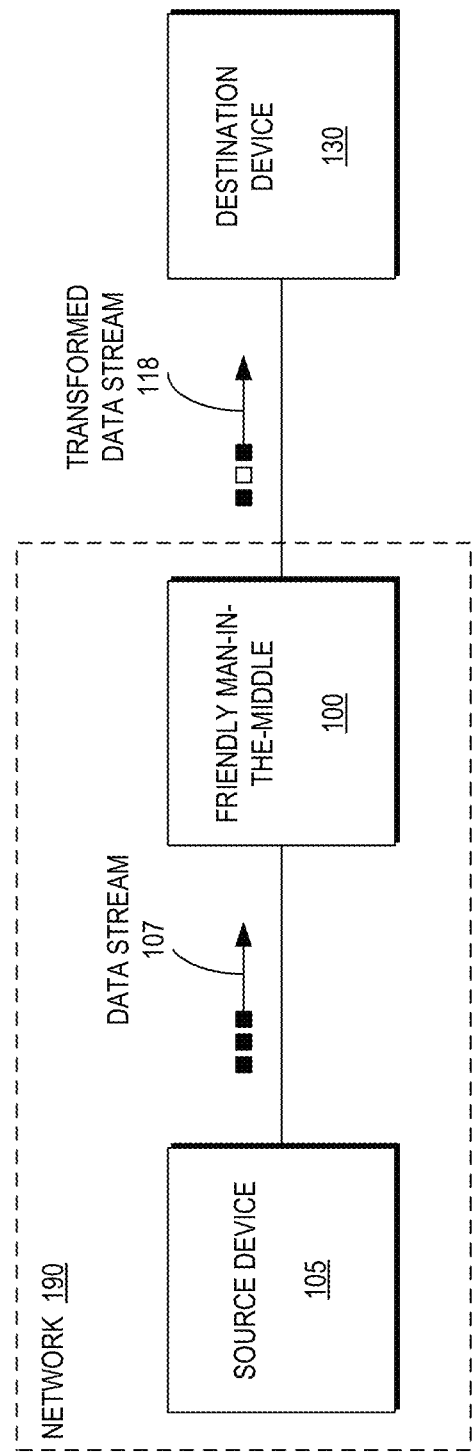
FIGS. 1 and 2 are block diagrams illustrating an example embodiment of the present invention deployed in a network environment.

FIG. 1 is a block diagram illustrating an example embodiment of the present invention 100 in a network environment 190. As illustrated in FIG. 1, the network 190 includes a source device 105 that may transmit a data stream 107 intended for a destination (e.g., destination device 130). However, a friendly (i.e., blessed) man-in-the-middle (FMITM) 100 receives (i.e., intercepts) the data stream 107 before the data stream escapes the network 190 toward the destination device 130. As will be discussed in greater detail below, the FMITM 100 performs a contextual analysis of content (i.e., payload) of privacy-related portions of the data stream 107. The FMITM 100 then forwards the privacy-related portions of the data stream 107 out of the network 190 to the intended destination device 130 as a transformed data stream 118 according to the contextual analysis.

Figure 2:
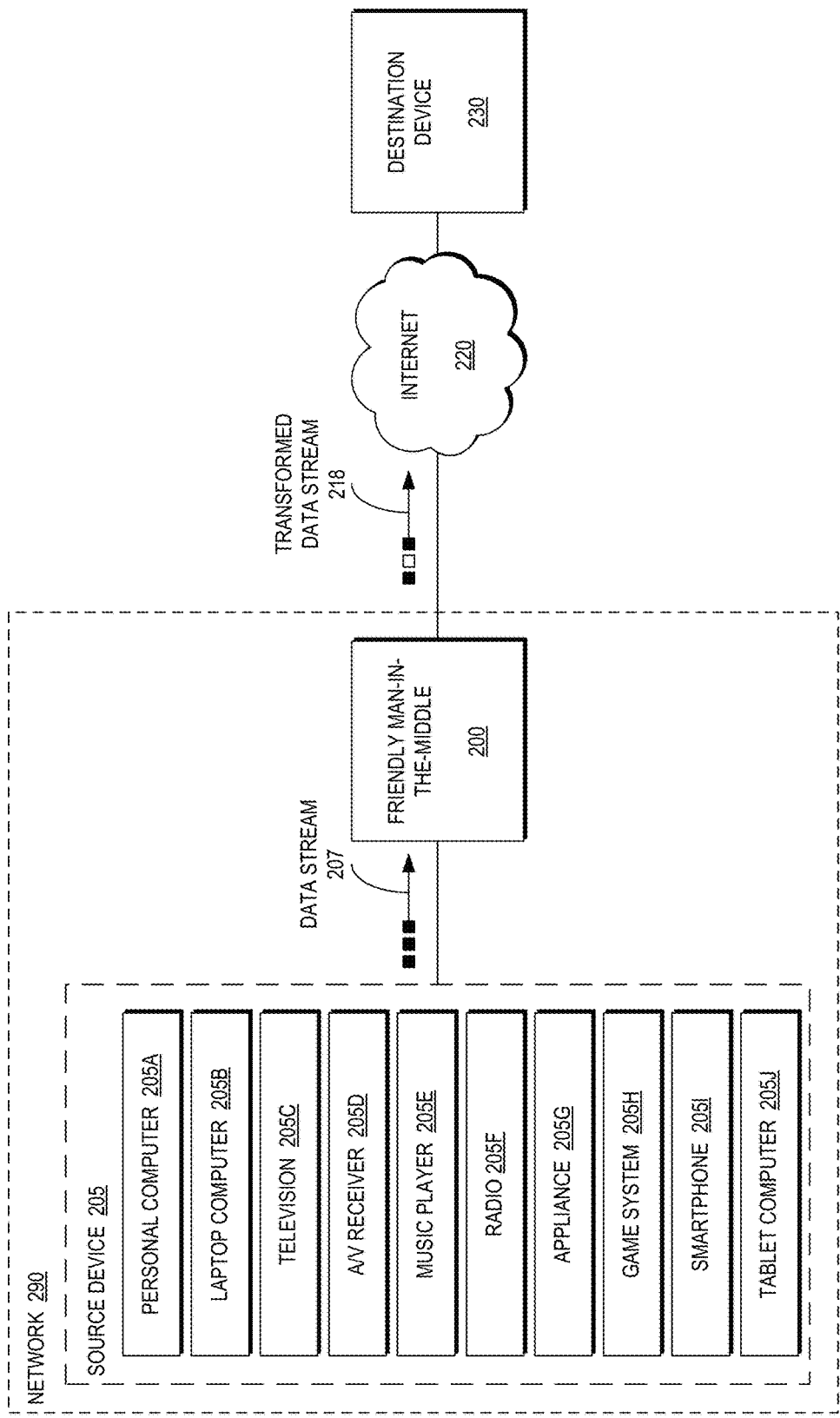

FIG. 2 is a block diagram illustrating an example embodiment of the present invention 200 in a network environment 290. As illustrated in FIG. 2, the network 290 includes a source device 205 (e.g., personal computer 205A, laptop computer 205B, television 205C, A/V receiver 205D, music player 205E, radio 205F, appliance 205G, game system 205H, smartphone 205I, and table computer 205J) that may transmit a data stream 207 intended for a destination (e.g., destination device 230). However, a FMITM 200 receives (i.e., intercepts) the data stream 207 before the data stream escapes the network 290 toward the destination device 230 over the Internet 220. It should be understood that the FMITM 200 may intercept both wired (e.g., over Ethernet) and wireless (e.g., over WiFi) data streams 207 in the network 290.

Likewise, the FMITM 200 may include additional hardware, such as a picocell, from a cellular telephony carrier to permit the FMITM 200 to intercept wireless communications (i.e., voice and data) from cellular telephones, tablet computers and the like connected to the cellular telephony carrier (e.g., over 3G or 4G connections). The FMITM 200 then forwards the privacy-related portions of the data stream 207 out of the network 290 to the intended destination device 230 as a transformed data stream 218 according to the contextual analysis. In other embodiments, the FMITM 200 may include hardware to act as a repeater for the cellular telephony carrier so that it may intercept wireless communications and forward them back to the cellular telephony carrier's network (e.g., 3G or 4G network).

Further, unknown devices (not shown) found on the network 290 by the FMITM 200 may be constrained by a strict (i.e., default) policy until it is determined what the device is. For example, the FMITM 200 may monitor the context and the content of communications from the unknown device and, based on that monitored context and content information, determine the unknown device's type and apply a policy assigned to that device type. In other embodiments, the default policy may block all network communications for the unknown device. A notification may be sent to an administrator to determine, for example, the device type and user, and what policy should be applied to the device, thereby providing the administrator control over network access by unknown devices.

Figure 3:
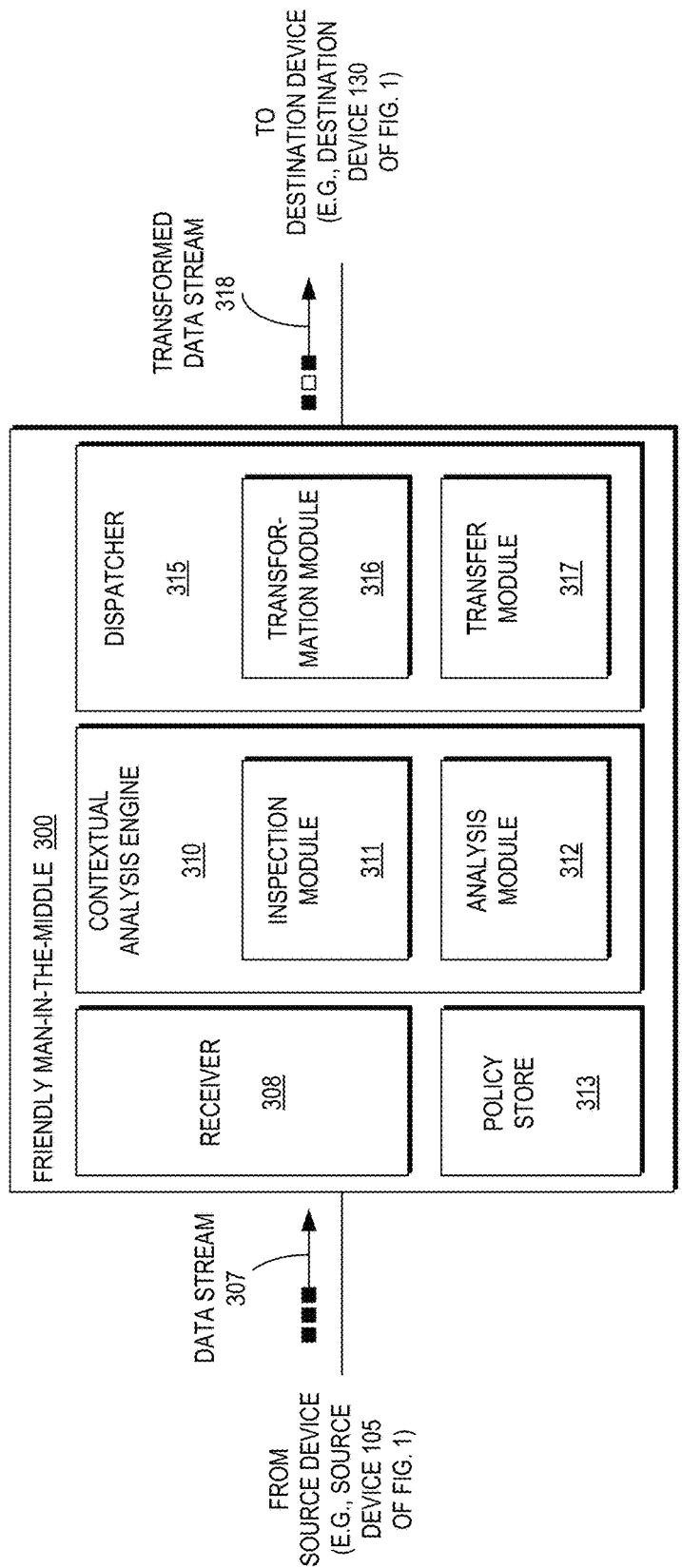
FIG. 3 is a block diagram illustrating an example embodiment of the present invention for removing privacy-related information from a data stream.
Figure 4:
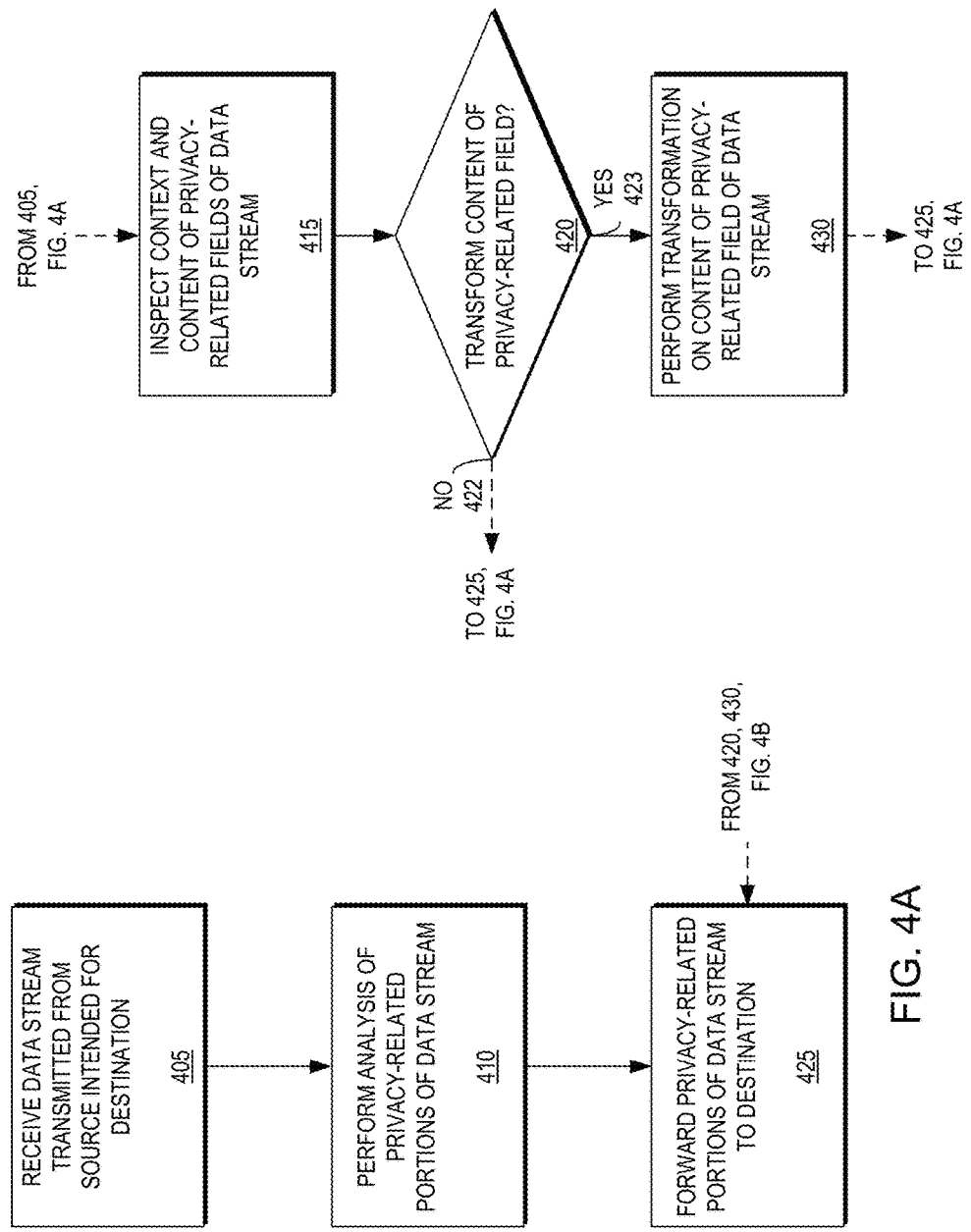
FIGS. 4A-4B are flow diagrams illustrating a method for removing privacy-related information from a data stream according to an example embodiment of the present invention.

FIG. 3 is a block diagram illustrating an example embodiment of the present invention 300 for removing privacy-related information from a data stream 307. FIGS. 4A-4B are flow diagrams illustrating a method for removing privacy-related information from a data stream according to an example embodiment of the present invention. FIGS. 3 and 4A-4B may be described in conjunction.

As illustrated in FIGS. 3 and 4A, a FMITM 300 includes a receiver 308 configured to receive a data stream 307 transmitted from a source (e.g., source device 105 of FIG. 1) intended for a destination (e.g., destination device 130 of FIG. 1) (405). A contextual analysis engine 310 then performs a contextual analysis of content of privacy-related portions of the data stream 307 (410). A dispatcher 315 then may forward the privacy-related portions of the data stream to the destination device (e.g., destination device 130 of FIG. 1) according to the contextual analysis performed by the contextual analysis engine 310 (425).

In certain embodiments, as illustrated in FIGS. 3 and 4B, the contextual analysis engine 310 may include an inspection module 311 that inspects the context and the content of respective privacy-related fields of the data stream 307 (415) and an analysis module 312 that determines whether the context and the content of the respective privacy-related fields of the data stream 307 requires transformation of the content of the respective privacy-related fields according to a policy (e.g., from the policy store 313) (420). The analysis module 312 may perform packet inspection, but within the context of the data stream. Policies may be assigned according to data stream context, including user, service, and device; and data stream content, including keywords, file types, and file contents.

If the analysis module 312 determines that the context and the content of the respective privacy-related fields of the data stream 307 do not require transformation of the content of the respective privacy-related fields according to a policy (422), a transfer module 317 of the dispatcher 315 forward the respective privacy-related fields of the data stream 307 to the destination (e.g., destination device 130 of FIG. 1) (425). Conversely, if the analysis module 312 determines that the context and the content of the respective privacy-related fields of the data stream 307 do require transformation of the content of the respective privacy-related fields according to a policy (423), a transformation module 316 of the dispatcher 315 performs a transformation on the content of the privacy-related fields of the data stream (430). As will be show in FIG. 5, in other words, the transformation module 316 transforms the content of the privacy-related field of the data stream according to the policy and replaces the content of the privacy-related field of the data stream with the transformed content to conform to the policy. The transfer module 317 of the dispatcher 315 then forwards the transformed portion of the data stream 307 to the destination (e.g., destination device 130 of FIG. 1) as a transformed data stream 318 (425). Inspecting both the context and the content of the privacy-related information minimizes "false positives" that may arise if only the context was analyzed.

Figure 5:
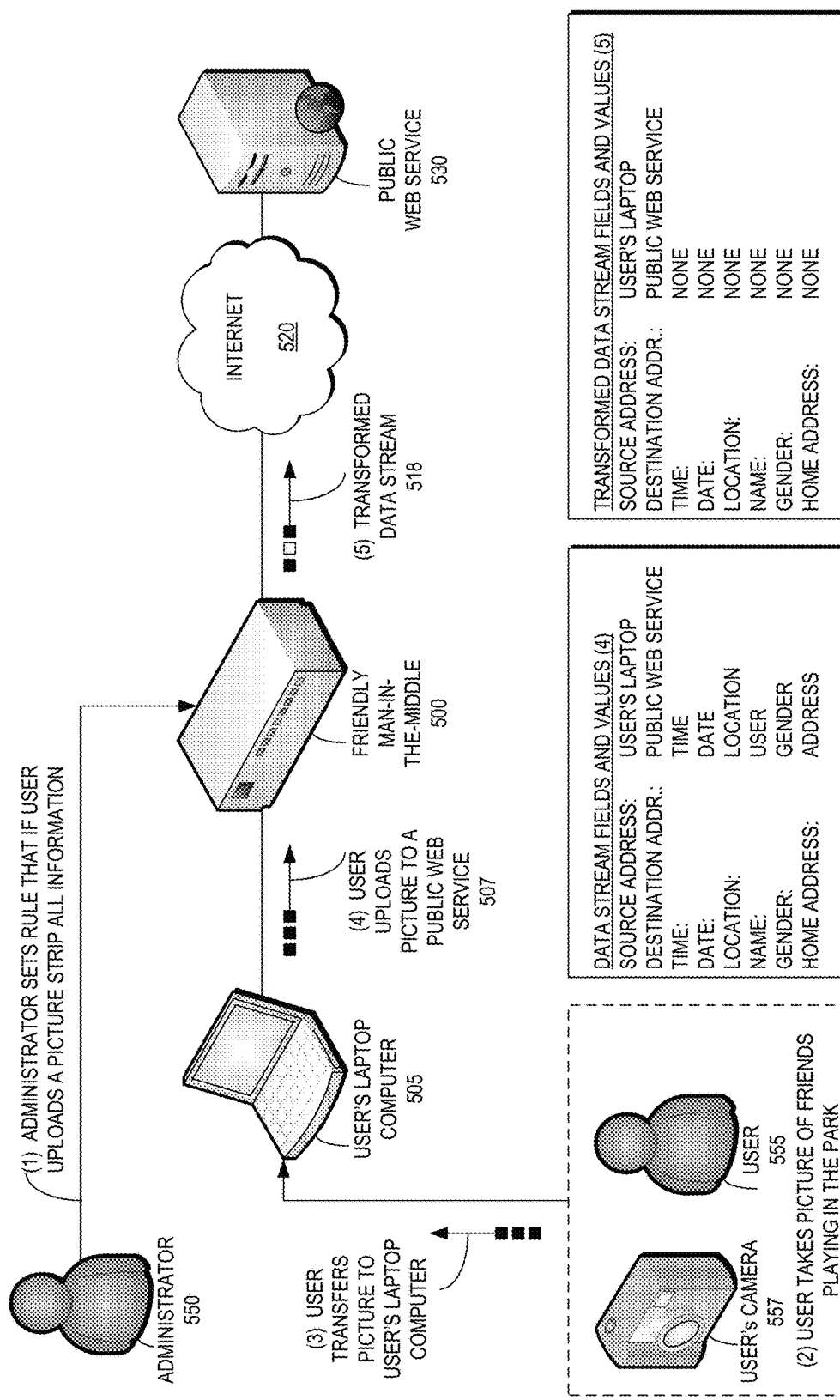
FIG. 5 is a block diagram illustrating changes to the data stream, including removal of privacy-related information.

FIG. 5 is a block diagram illustrating changes to a data stream, including removal of privacy-related information. As illustrated in FIG. 5, (1) an administrator 550 may set a rule or policy that, if a particular user 555 uploads a picture from the user's camera 557 to a public web service 530, the FMITM 500 should strip all privacy-related information from the tags (i.e., metadata) of the picture. The FMITM 500 may identify the user 555 by the user's account on the user's laptop computer 505 or the user's account on the public web service 530, such as by monitoring the communications to the web based service 530 within a browser session. Later, (2) the user 555 takes a picture of his friends playing in a park and (3) transfers the picture to the user's laptop computer 505. As understood in the art, digital picture files typically include metadata about the picture, such as the time, date and location that the picture was taken, all of which may be considered privacy-related information.

The user 555 then (4) uploads the picture to the public web service 530. As understood in the art, during the process of uploading the picture to the public web service 530, additional privacy-related information may be added to the data stream 507 for the picture. For example, the public web service 530 may extract the user's name, gender and home address from various resources on the user's laptop computer 505 or from public web service registration information for the user 555. Thus, the data stream 507 for the digital picture file may include, not only the source and destination addresses of the data stream 507 and the metadata for the picture (i.e., time, date and location that the picture was taken), but also personally identifiable information related to the user 555, such as the user's name, gender and home address.

However, as described above, the FMITM 500, having been configured by the administrator 550, receives (i.e., intercepts) the data stream 507 for the uploading picture from the user's laptop computer 505 before it leaves the network toward the public web service 530 via the Internet 520. The FMITM 500 performs a contextual analysis of the content of privacy-related portions of the data stream.

In other words, the FMITM 500 inspects the context of the data stream 507 (i.e., uploading a picture from the user's laptop computer 505 to the public web service 530) and inspects the content of privacy-related fields of the data stream 507. The FMITM 500 then determines whether the context and the content of the respective privacy-related fields of the data stream requires transformation of the content of the respective privacy-related fields according to a policy. Depending on the goals of the rule or policy established by the adminstrator 550, certain fields of the data stream 507 may or may not be considered privacy-related.

As illustrated in FIG. 5, the administrator 550 has determined that all content-related fields of the data stream 507 are considered privacy-related and has configured the FMITM 500 to strip all information from such privacy-related fields. Thus, when forwarding portions of the data stream 507 to the public web service 530 as a transformed data stream 518, the FMITM 500 performs a transformation on the content of the privacy-related fields of the data stream 507 and forwards the transformed portion of the data stream 507 to the destination 530 as a transformed data stream 518. To transform the content of the privacy-related fields of the data stream, the FMITM 500 transforms the content of the privacy-related fields of the data stream according to the policy (i.e., here, strips all information) and replaces the content of the privacy-related fields of the data stream 507 with the transformed content (e.g., a blank or null value) to conform to the policy. Therefore, in summary, the FMITM 500 removes the time, date, location, name, gender and home address information from the data stream 507 according to the policy established by the administrator 550 prior to forwarding the transformed data stream 518 to the public web service 530.

Figure 6:
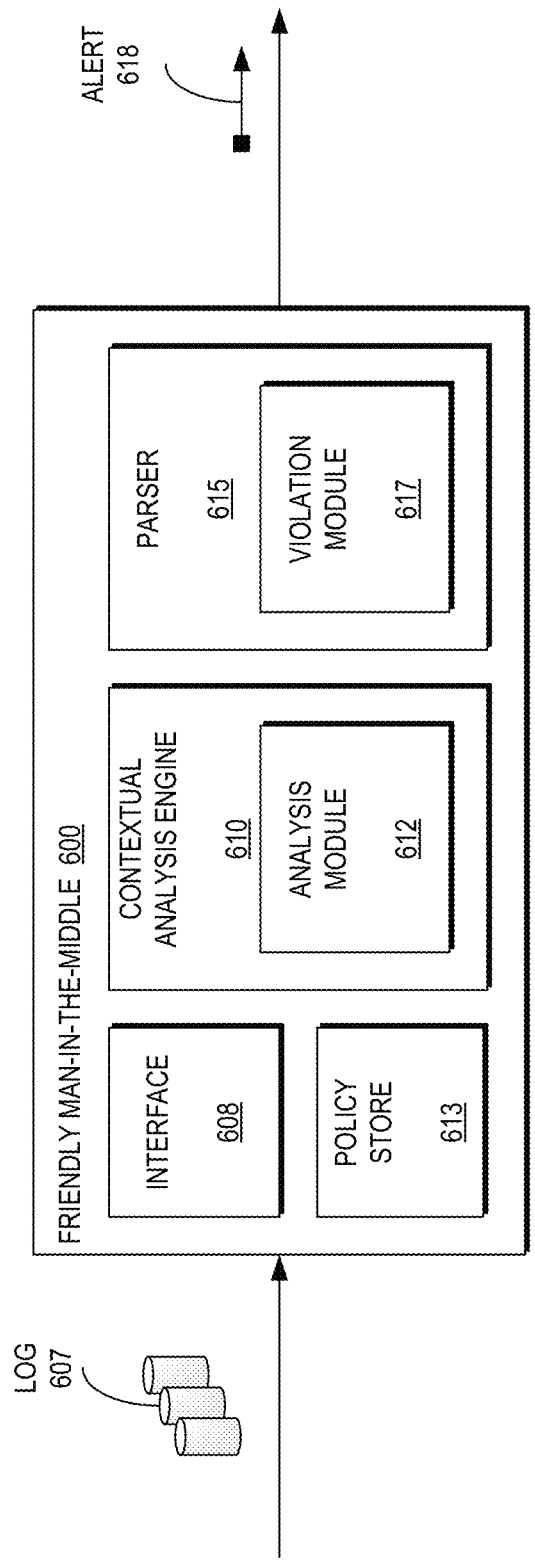
FIG. 6 is a block diagram illustrating an example embodiment of the present invention for parsing privacy-related information in a log for a data stream.
Figures 7A, 7B:
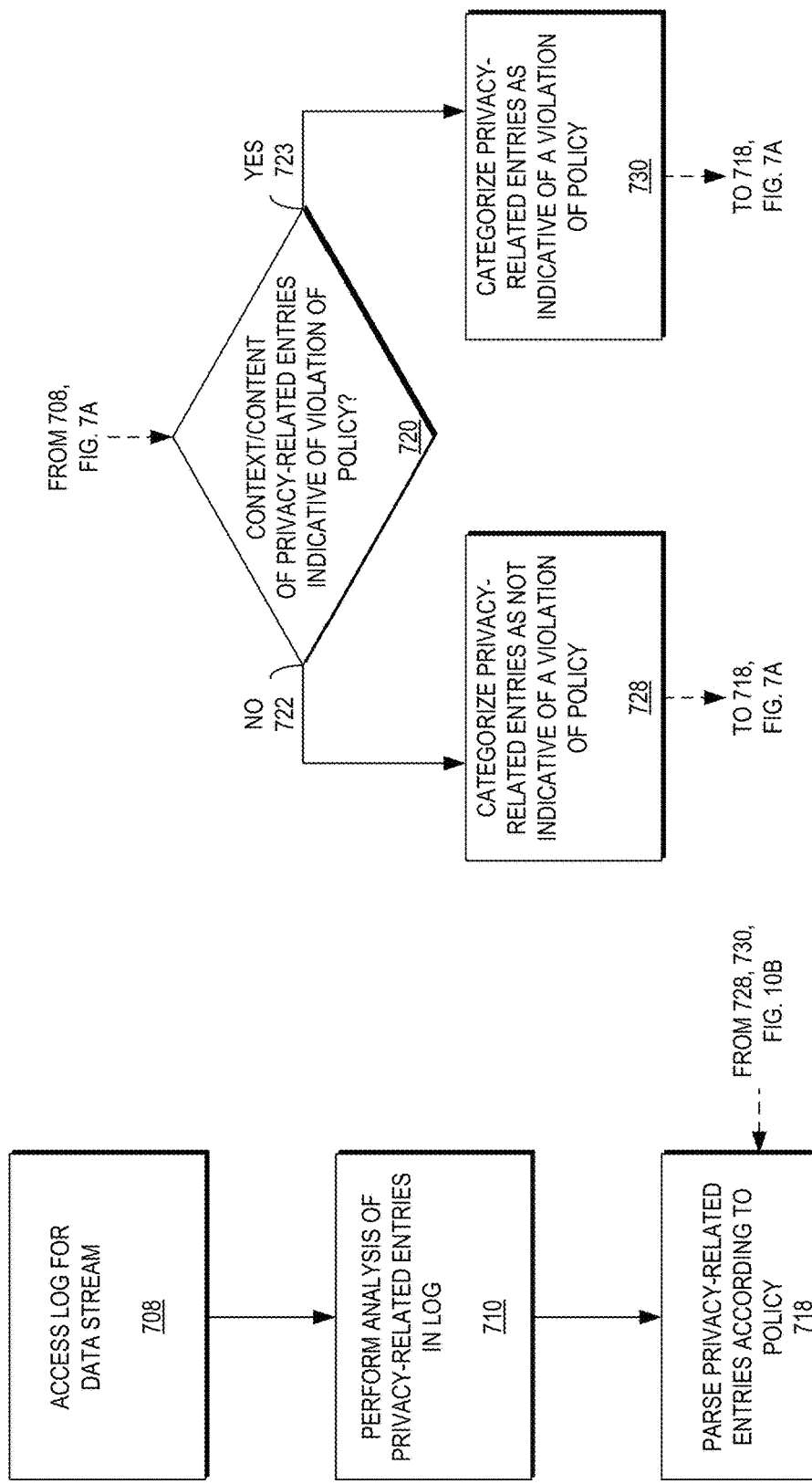
FIGS. 7A-7B are flow diagrams illustrating a method for parsing privacy-related information in a log for a data stream according to an example embodiment of the present invention.

FIG. 6 is a block diagram illustrating an example embodiment of the present invention 600 for parsing privacy-related information in a log 607 for a data stream. FIGS. 7A-7B are flow diagrams illustrating a method for parsing privacy-related information in a log 607 for a data stream according to an example embodiment of the present invention. FIGS. 6 and 7A-7B may be described in conjunction. In certain embodiments, the log 607 may include log entries for both incoming and outgoing data communications. In a preferred embodiment, the log 607 is generated and maintained by the FMITM 600.

As illustrated in FIGS. 6 and 7A, a FMITM 600 includes an interface 608 configured to access a log 607 for a data stream (708). A contextual analysis engine 610 then performs a contextual analysis of content of privacy-related entries in the log 607 for the data stream (710). A parser 615 then may parse the privacy-related entries in the log 607 for the data stream according to a policy (e.g., a policy store 613) (718).

In certain embodiments, as illustrated in FIGS. 6 and 7B, the contextual analysis engine 610 may include an analysis module 612 that analyzes the context and the content of the privacy-related entries in the log 607 (415). In certain embodiments, the analysis module may inspect attributes relating to the entries in the log for the data stream, including user, group, identity, device, service, packet header, address, date, time and protocol.

Likewise, the parser 615 may include a violation module 617 that determines whether the context and the content of the respective privacy-related entries in the log 607 for the data stream are indicative of a violation of the policy (720). In certain embodiments, the violation module 617 may identify that the context and the content of a respective privacy-related entry in the log 607 for the data stream i-s as not indicative of a violation of the policy (722) and categorize the privacy-related entry in the log 607 for the data stream as not indicative of a violation of the policy (728). Conversely, the other embodiments, the violation module 617 may identify the context or the content of a respective privacy-related entry in the log 607 for the data stream as indicative of a violation of the policy (723) and categorize the privacy-related entry in the log 607 for the data stream as indicative of a violation of the policy (730) and send an alert 618 (FIG.

Figure 8:
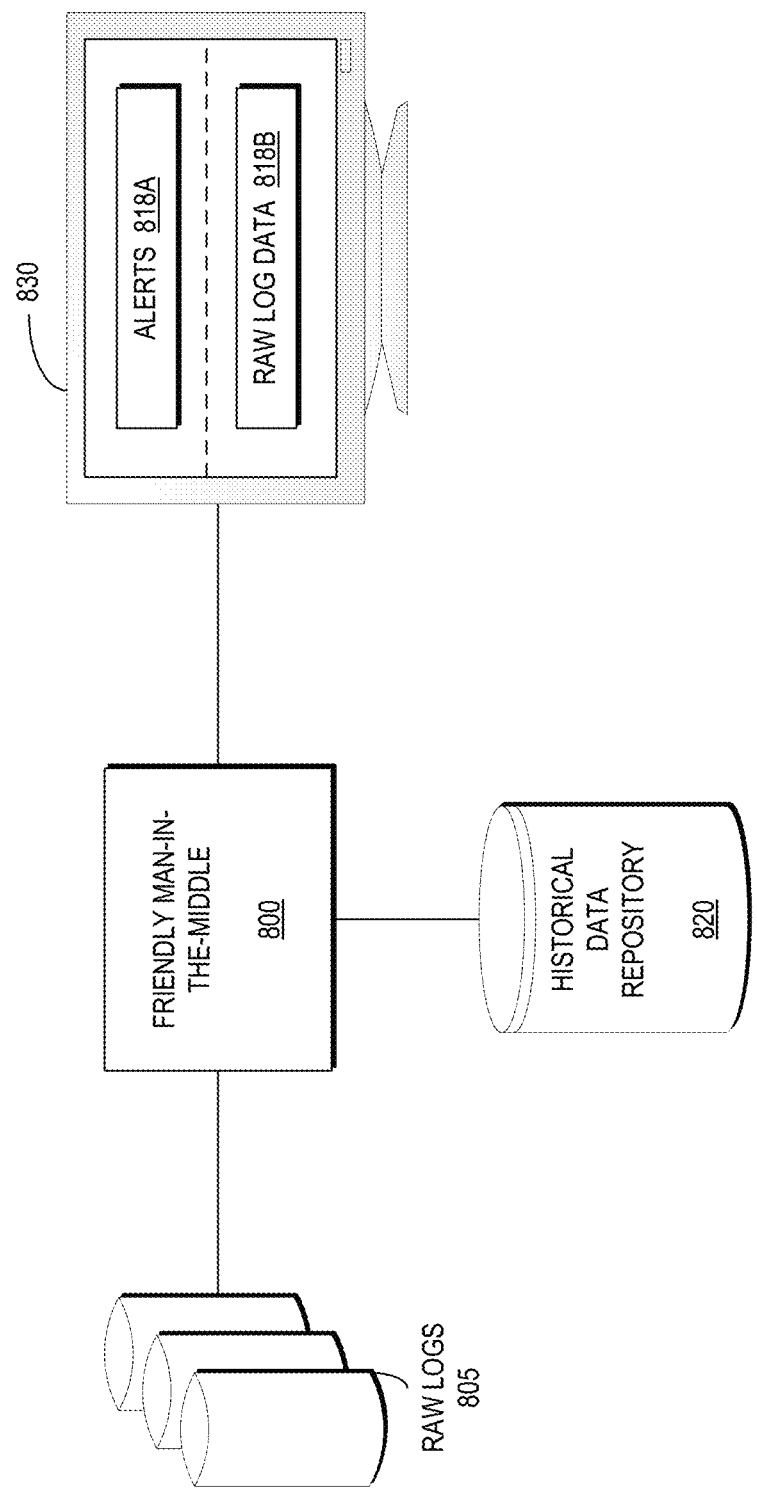
FIG. 8 is a block diagram illustrating privacy-related information in a log for a data stream.

FIG. 8 is a block diagram illustrating privacy-related information in a log 805 for a data stream. As illustrated in FIG. 8, raw logs 805 may be accessed by a FMITM 800 for analysis. Raw logs 805 may include router logs, application logs and any other log showing records of prior data transactions and events. The FMITM 800 then may perform a contextual analysis of content of privacy-related entries in the raw logs 805 and parse the privacy-related entries in the raw logs 805 according to a policy. For example, the FMITM 800 may parse the privacy-related entries in the raw logs 805 for display 830, with the policy defining log entries containing a potential security or privacy issue as alerts 818A displayed in red, bold or in another manner of highlighting. Similarly, log entries not containing a potential security or privacy issue (i.e., private to a user but with no cause for alarm) may be displayed 830 as raw log data 818B in white, or hidden altogether, according to the policy. Thus, the FMITM 800 is able to draw the attention of an administrator (not shown) to log entries containing a potential security or privacy issue 818A without overly invading the privacy of the user (not shown) by limiting the number of alerts 818A to only those log entries containing a potential security or privacy issue and not those log entries containing harmless information private to the user.

The FMITM 800 also may maintain a historical data repository 820 to store log data, either as raw logs 805 or parsed data. The contextual analysis engine (not shown) (e.g., contextual analysis engine 610 of FIG. 6) may compare the context of a privacy-related entry in the raw logs 805 against the historical data repository 820 to detect an unexpected value in the context of the data stream. For example, the historical data repository 820 may indicate a device is active during normal business hours. If the contextual analysis engine analyzes communications sent just after midnight, an alert may be provided because the context of those communications (i.e., time of day) is atypical to what is recorded in the historical data repository 820. Thus, the FMITM 800 may provide an alert 818A indicative of the unexpected value in the context of the data stream.

Figure 9:
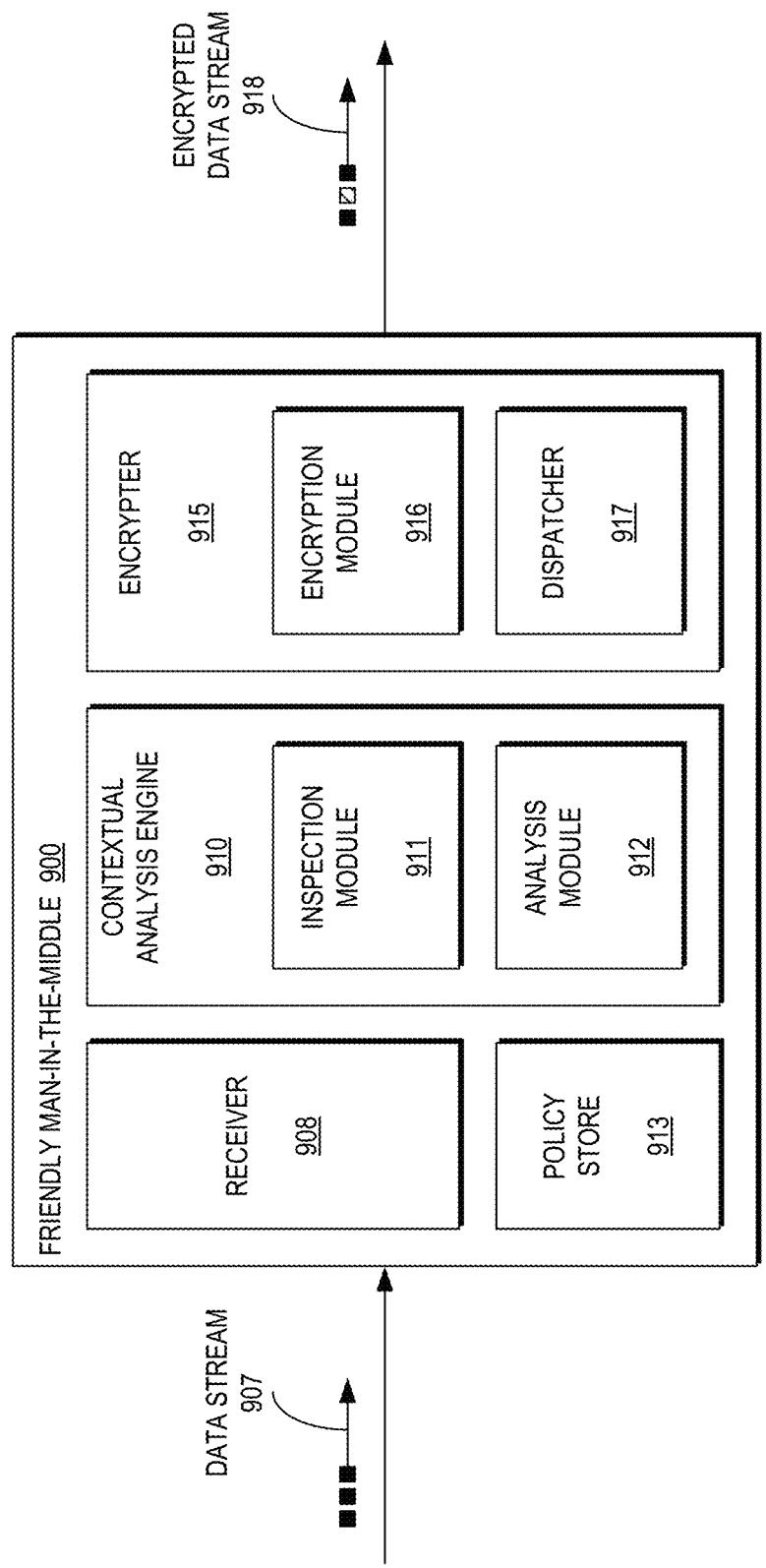
FIG. 9 is a block diagram illustrating an example embodiment of the present invention for encrypting privacy-related information in a data stream.
Figures 10A, 10B:
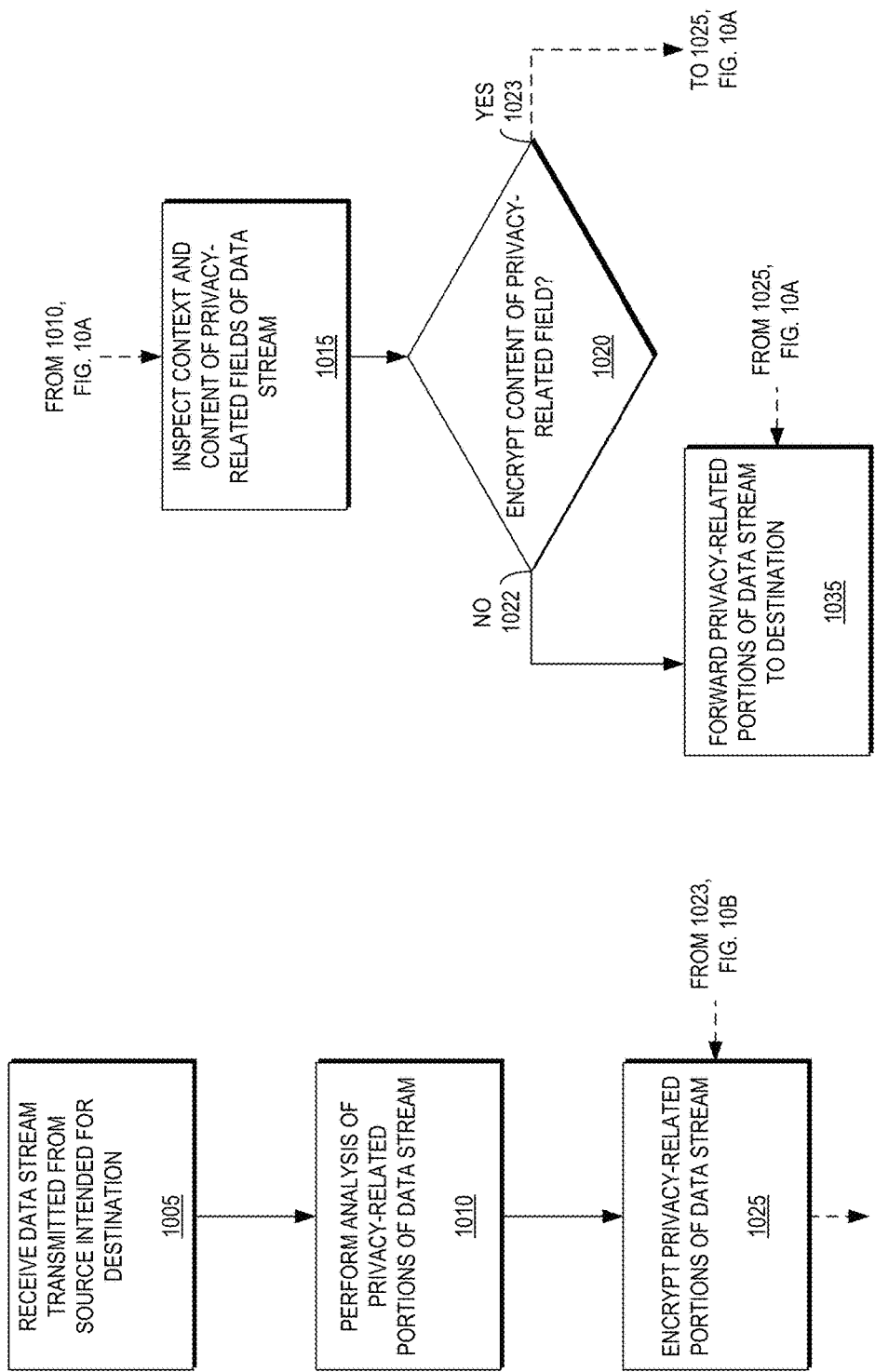
FIGS. 10A-10B are flow diagrams illustrating a method for encrypting privacy-related information in a data stream according to an example embodiment of the present invention.

FIG. 9 is a block diagram illustrating an example embodiment of the present invention 900 for encrypting privacy-related information in a data stream 907. FIGS. 10A-10B are a flow diagram illustrating a method for encrypting privacy-related information in a data stream according to an example embodiment of the present invention. FIGS. 9 and 10A-10B may be described in conjunction.

As illustrated in FIGS. 9 and 10A, a FMITM 900 includes a receiver 908 configured to receive a data stream 907 transmitted from a source (e.g., source device 105 of FIG. 1) intended for a destination (e.g., destination device 130 of FIG. 1) (1005). A contextual analysis engine 910 then performs a contextual analysis of content of privacy-related portions of the data stream 907 (1010). An encrypter 915 then may encrypt the content of the privacy-related portions of the data stream 907 according to the contextual analysis (1025).

In certain embodiments, as illustrated in FIGS. 9 and 10B, the contextual analysis engine 910 may include an inspection module 911 that inspects the context and the content of respective privacy-related fields of the data stream 907 (1015) and an analysis module 912 that determines whether the context and the content of the respective privacy-related fields of the data stream 907 requries encryption of the content of the respective privacy-related fields according to a policy (e.g., from the policy store 913) (1020).

If the analysis module 912 determines that the context and the content of the respective privacy-related fields of the data stream 907 do not require encryption of the content of the respective privacy-related fields according to a policy (1022), a dispatcher 917 of the encrypter 915 forwards the respective privacy-related fields of the data stream 907 to the destination (e.g., destination device 130 of FIG. 1) (1035). Conversely, if the analysis module 912 determines that the context and the content of the respective privacy-related fields of the data stream 907 do require encryption of the content of the respective privacy-related fields according to a policy (1023), an encryption module 916 of the encrypter 915 encrypts the content of the privacy-related fields of the data stream (1025). The encrypted content of the privacy-related fields of the data stream is then forwarded to the destination (1035). As will be show in FIG. 11, in other words, the encryption module 916 encrypts the content of the privacy-related field of the data stream according to the policy and replaces the content of the privacy-related field of the data stream with the encrypted content to conform to the policy. The dispatcher 917 of the encrypter 915 then forwards the encrypted portion of the data stream 907 to the destination (e.g., destination device 130 of FIG. 1) as an encrypted data stream 918 (1035).

Figure 11:
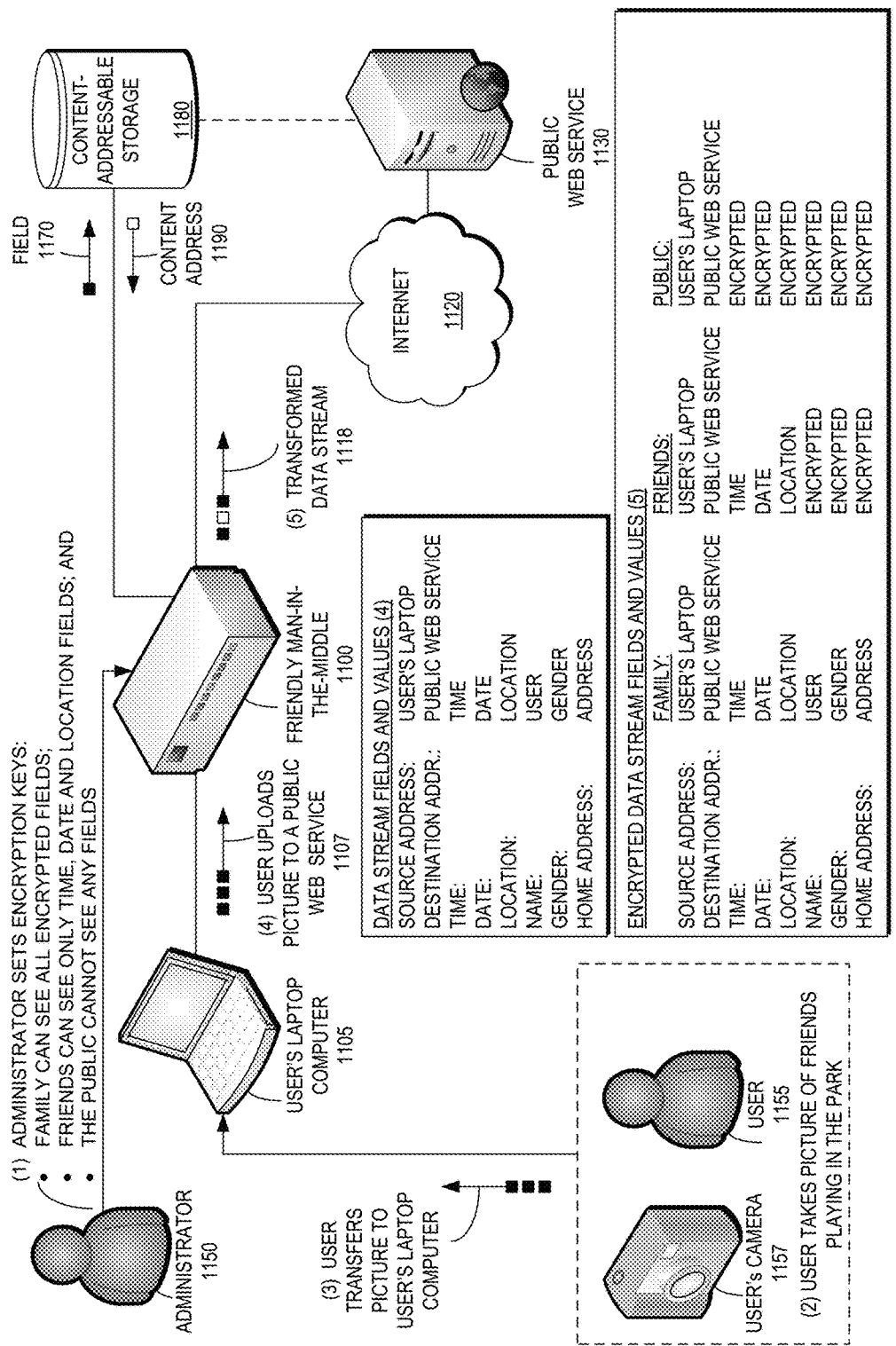
FIG. 11 is a block diagram illustrating changes to the data stream, including encryption of privacy-related information.

FIG. 11 is a block diagram illustrating changes to a data stream, including encryption of privacy-related information. As illustrated in FIG. 11, (1) an administrator 1150 may set a rule or policy that, if a particular user 1155 uploads a picture from the user's camera 1157 to a public web service 1130, the FMITM 1100 should encrypt all privacy-related information in the metadata of the picture. In certain embodiments, the administrator 1150 may set different encryption keys for different groups that may want to decrypt the privacy-related information. For example, the administrator 1150 may set an encryption key such that all family members of the user 1155 can see all encrypted fields, friends of the user 1155 can see only time, date, and location fields, and the public cannot see any encrypted fields.

Later, (2) the user 1155 takes a picture of his friends playing in a park and (3) transfers the picture to the user's laptop computer 1105. As understood in the art, digital picture files typically include metadata about the picture, such as the time, date and location that the picture was taken, all of which may be considered privacy-related information.

The user 1155 then (4) uploads the picture to the public web service 1130. As understood in the art, during the process of uploading the picture to the public web service 1130, additional privacy-related information may be added to the data stream 1107 for the picture. For example, the public web service 1130 may extract the user's name, gender and home address from various resources on the user's laptop computer 1105 or from public web service registration information for the user 1155. Thus, the data stream 1107 for the digital picture file may include, not only the source and destination addresses of the data stream 1107 and the metadata for the picture (i.e., time, date and location that the picture was taken), but also personally identifiable information related to the user 1155, such as the user's name, gender and home address.

However, as described above, the FMITM 1100, having been configured by the administrator 1150, receives (i.e., intercepts) the data stream 1107 for the uploading picture from the user's laptop computer 1105 before it leaves the network toward the public web service 1130 via the Internet 1120. The FMITM 1100 performs a contextual analysis of the content of privacy-related portions of the data stream.

In other words, the FMITM 1100 inspects the context of the data stream 1107 (i.e., uploading a picture from the user's laptop computer 1105 to the public web service 1130) and inspects the content of privacy-related fields of the data stream 1107. The FMITM 1100 then determines whether the context and the content of the respective privacy-related fields of the data stream requires encryption of the content of the respective privacy-related fields according to a policy. Depending on the goals of the rule or policy established by the adminstrator 1150, certain fields of the data stream 1107 may or may not be considered privacy-related.

As illustrated in FIG. 11, the administrator 1150 has determined that all content-related fields of the data stream 1107 are considered privacy-related and has configured the FMITM 1100 to encrypt all information from such privacy-related fields. Thus, when forwarding portions of the data stream 1107 to the public web service 1130 as a transformed data stream 1118, the FMITM 1100 encrypts the content of the privacy-related fields of the data stream 1107 and forwards the encrypted portion of the data stream 1107 to the destination 1130 as an encrypted data stream 1118. To encrypt the content of the privacy-related fields of the data stream, the FMITM 1100 encrypts the content of the privacy-related fields of the data stream according to the policy (i.e., here, encrypts all information) and replaces the content of the privacy-related fields of the data stream 1107 with the encrypted content to conform to the policy. Therefore, in summary, the FMITM 1100 encrypts the time, date, location, name, gender and home address information from the data stream 1107 according to the policy established by the administrator 1150 prior to forwarding the transformed data stream 1118 to the public web service 1130.

However, as described above, various decryption keys may be provided so that different user groups of the public web service 1130 may decrypt the encrypted privacy-related information in the encrypted data stream 1118. For example, family member of the user 1155 may be provided a key that can decrypt all encrypted fields; friends of the user 1155 may be provided a key that can decrypt only time, date, and location fields; and the public may not be provided a key at all. Thus, as illustrated in FIG. 11, the user's 1155 family may decrypt the time, date, location, name, gender and home address fields; the user's 1155 friends may decrypt the time, date, and location fields; and the public may not decrypt any fields and may access only those fields not encrypted (i.e., non-privacy-related fields, such as source address and destination address of the data stream 1107). Accordingly, the FMITM 1100 may operate in conjunction with an identification verification service to control the issuance of decryption keys for granting various users of the public web service 1130 access to the encrypted content.

It should be understood that, to encrypt the content of the privacy-related fields, a content address may be generated. The FMITM 1100 may strip a field 1170 (e.g., location or gender) out of the data stream 1107, which may be stored to a content-addressable storage device 1180, such as a EMC Centera by EMC Corporation of Hopkinton, Mass. The content-addressable storage device 1180 returns a content address 1190 which may be stored into the transformed data stream 1118. The content-addressable storage device 1180 may be local to the FMITM 1100 or part of a shared service accessible by both the user 1155 and other users that may wish to access the field 1170 stored to the content-addressable storage device 1180.

When another user (not shown) attempts to view the encrypted content (i.e., the picture) via the public web service 1130, including privacy-related fields, an attempt is made to retrieve the field 1170 from the content-addressable storage 1180 using the content address 1190 from the transformed data stream 1118. If the other user (i.e., viewer) is properly authenticated at the content-addressable storage device 1180, the field 1170 is returned and inserted into the data stream 1118. Viewer authentication may be performed via a generic login service provided by the public web service 1130. Additionally, the FMITM 1100 and the public web service 1130 may authenticate the viewer via a federated identity for Single sign-on (SSO), such as OpenID and Windows Live ID.

Figure 12:
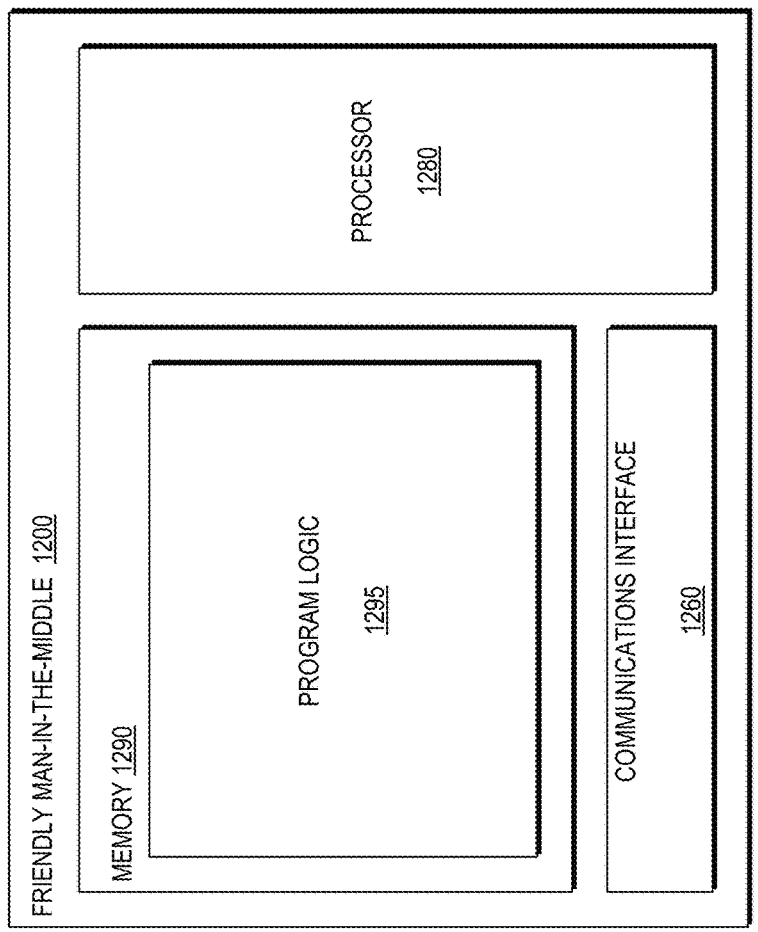
FIG. 12 is a block diagram of an example embodiment apparatus according to the present invention.

FIG. 12 is a block diagram of an example embodiment FMITM 1200 according to the present invention. The FMITM 1200 includes memory 1290 storing program logic 1295, a processor 1280, and a communications interface 1260.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 12, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

Figure 13:
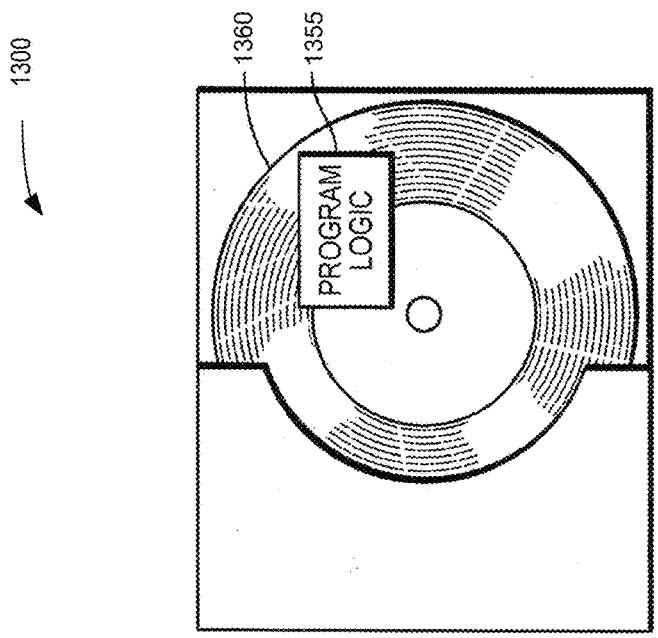
FIG. 13 is an illustration of an example embodiment of the present invention as embodied in program code.

FIG. 13 shows program logic 1355 embodied on a computer-readable medium 1360 as shown, and wherein the logic is encoded in computer-executable code configured for carrying out the gas controlling process of this invention and thereby forming a computer program product 1300.

The logic for carrying out the method may be embodied as part of the aforementioned system, which is useful for carrying out a method described with reference to embodiments shown in, for example, FIGS. 1-11. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A computer-implemented method, comprising:
   receiving a data stream transmitted from a source device intended for a destination device by an intercepting device other than the source device and collocated with the source device in a network at a location in a data path between the source device and the destination device;
   performing a contextual analysis of content of one or more privacy-related portions of the data stream, by the intercepting device;
   encrypting at least part of the content of the one or more privacy-related portions of the data stream according to the contextual analysis, including:
      generating a content address for content of at least one privacy-related field of the one or more privacy-related portions of the data stream according to a policy; and
      utilizing the content address in place of the corresponding content of the at least one privacy-related field; and forwarding, as a transformed data stream, an encrypted portion of the data stream, together with a non-encrypted portion of the data stream, toward the destination device;

wherein the encrypted portion of the transformed data stream includes the content address;

wherein the content address is utilizable to access the corresponding content in a content-addressable storage device;

wherein the encrypted portion of the transformed data stream comprises at least:
   a first part comprising a first encrypted content of a first privacy-related field; and
   a second part comprising the encrypted content address for a second privacy-related field; and wherein the first and second parts of the encrypted portion of the transformed data stream are encrypted utilizing respective distinct encryption keys.

2. The method of claim 1 wherein performing a contextual analysis comprises:
   inspecting context and content of the at least one privacy-related field of the one or more privacy-related portions of the data stream; and
   determining whether the context and the content of the at least one of the privacy-related field requires encryption of the content of the at least one privacy-related field according to the policy.

3. The method of claim 2 wherein encrypting the content comprises:
   encrypting at least part of the content of the at least one of the privacy-related field according to the policy.

4. The method of claim 3 wherein encrypting the content comprises encrypting the content of the at least one privacy-related field according to an identification verification service.

5. The method of claim 3 further comprising providing a private key for decrypting the content of the at least one privacy-related field.

6. The method of claim 3 wherein receiving the data stream comprises receiving a data stream transmitted from the source device intended for the destination device in a manner irrespective of source-type; and
   wherein forwarding the encrypted portion of the data stream to the destination device comprises forwarding the encrypted portion of the data stream to the destination device in a manner transparent to the destination device.

7. The method of claim 3 wherein the policy is specific to a user.

8. The method of claim 3 wherein the policy is specific to a content type.

9. An apparatus, comprising:
a processor; and
memory encoded with computer program code that, when executed on the processor, causes the apparatus to:
   receive a data stream transmitted from a source device intended for a destination device by an intercepting device other than the source device and collocated with the source device in a network at a location in a data path between the source device and the destination device;
   perform a contextual analysis of content of one or more privacy-related portions of the data stream, by the intercepting device;
   encrypt at least part of the content of the one or more privacy-related portions of the data stream according to the contextual analysis, including:
      generate a content address for content of at least one privacy-related field of the one or more privacy-related portions of the data stream according to a policy; and
      utilize the content address in place of the corresponding content of the at least one privacy-related field; and
   forward, as a transformed data stream, an encrypted portion of the data stream, together with a non-encrypted portion of the data stream, toward the destination device;

wherein the encrypted portion of the transformed data stream includes the content address;

wherein the content address is utilizable to access the corresponding content in a content-addressable storage device;

wherein the encrypted portion of the transformed data stream comprises at least:
   a first part comprising a first encrypted content of a first privacy-related field; and
   a second part comprising the encrypted content address for a second privacy-related field; and wherein the first and second parts of the encrypted portion of the transformed data stream are encrypted utilizing respective distinct encryption keys.

10. The apparatus of claim 9 wherein the apparatus is further operable to:
   inspect context and content of the at least one privacy-related field; and
   determine whether the context and the content of the at least one privacy-related field requires encryption of the content of the at least one privacy-related field according to the policy.

11. The apparatus of claim 10 wherein the apparatus is further operable:
   to encrypt the content of the at least one privacy-related field according to the determination of whether the context and the content of the at least one privacy-related field requires encryption of the content of the at least one privacy-related field according to the policy.

12. The apparatus of claim 11 wherein the apparatus is further operable to encrypt the content of the at least one privacy-related field according to an identification verification service.

13. The apparatus of claim 11 wherein the apparatus is further operable to provide a private key for decrypting the content of the at least one privacy-related field.

14. The apparatus of claim 11 wherein the apparatus is further operable to receive a data stream transmitted from the source device intended for the destination device in a manner irrespective of source-type and forward the encrypted portion of the data stream to the destination device in a manner transparent to the destination device.

15. The apparatus of claim 11 wherein the policy is specific to at least one of a user and a content type.

16. A computer program product including a non-transitory computer-readable storage medium encoded with computer program code that, when executed on a processor of a computer, cause the computer to perform encryption, the computer program product comprising:
   computer program code for receiving a data stream transmitted from a source device intended for a destination device by an intercepting device other than the source device and collocated with the source device in a network at a location in a data path between the source device and the destination device;

computer program code for performing a contextual analysis of content of privacy-related portions of the data stream, by the intercepting device;

computer program code for encrypting at least part of the content of the privacy-related portions of the data stream according to the contextual analysis, including:
- generating a content address for content of at least one privacy-related field of the one or more privacy-related portions of the data stream according to a policy; and
- utilizing the content address in place of the corresponding content of the at least one privacy-related field; and computer program code for forwarding, as a transformed data stream, an encrypted portion of the data stream, together with a non-encrypted portion of the data stream, toward the destination device;

wherein the encrypted portion of the transformed data stream includes the content address;

wherein the content address is utilizable to access the corresponding content in a content-addressable storage device;

wherein the encrypted portion of the transformed data stream comprises at least:
- a first part comprising a first encrypted content of a first privacy-related field; and
- a second part comprising the encrypted content address for a second privacy-related field; and wherein the first and second parts of the encrypted portion of the transformed data stream are encrypted utilizing respective distinct encryption keys.

17. The computer program product of claim 16 wherein the computer program code for performing a contextual analysis of content of privacy-related portions of the data stream comprises:

computer program code for inspecting context and content of at least one privacy-related field of the one or more privacy-related portions of the data stream; and computer program code for determining whether the context and the content of the at least one privacy-related field requires encryption of the content of the at least one privacy-related field according to the policy; and wherein computer program code for encrypting the at least part of the content of the one or more privacy-related portions according to the contextual analysis comprises:
- computer program code for encrypting the content of the at least one privacy-related field according to the determination of whether the context and the content of the at least one privacy-related field requires encryption of the content of the at least one privacy-related field according to the policy.

* * * * *